Y. J. AALTONEN.
INTERNAL COMBUSTION ENGINE.
APPLICATION FILED MAY 29, 1919.

1,390,741.

Patented Sept. 13, 1921.
2 SHEETS—SHEET 2.

Inventor
Yrjö Johannes Aaltonen
by Laurence Laugmer
Attorney

UNITED STATES PATENT OFFICE.

YRJÖ JOHANNES AALTONEN, OF TAMPERE, FINLAND.

INTERNAL-COMBUSTION ENGINE.

1,390,741.  Specification of Letters Patent.  Patented Sept. 13, 1921.

Application filed May 29, 1919. Serial No. 300,690.

*To all whom it may concern:*

Be it known that I, YRJÖ JOHANNES AALTONEN, a citizen of the State of Finland, residing at Tampere, Finland, have invented certain new and useful Improvements in Internal-Combustion Engines, of which the following is a specification.

This invention relates to internal combustion engines, and more particularly to the type of engines wherein the cylinders rotate.

In its more specific aspect the present invention relates to engines of this type wherein the crank shaft of the engine is free to rotate idly or to be connected to effect the rotation of the cylinders and the part connected thereto to perform the work desired.

According to this invention, the crank shaft is not fixed against rotation when the cylinders are rotating, as is usual in this type, but is caused to rotate in a reverse direction, suitable gearing being provided between the crank shaft and the cylinders for this purpose. This arrangement is advantageous in that it permits the high speed of the piston to be converted conveniently into a relatively low driving speed with the increase in tractive power proportional to the decrease of speed.

A further feature of this invention is the provision of improved means for changing the connections of the crank shaft from driving to non-driving arrangement. This means comprises a friction clutch whereby the changes may be made without jerking or sudden jarring to the relatively stationary parts. This clutch is preferably of the multi-disks type so that a slip may be maintained between the crank shaft and parts operatively connected therewith, whereby the driving speed of the motor may be regulated at will. The friction slip clutch may be operated and controlled from the driver's position in the usual or any approved manner. Therefore, when starting, the crank shaft may be free to rotate idly and the driving connection can be effectuated gradually by the gradual operation of the clutch. When the clutch is in its most effective position the drive is practically positive.

The embodiment of the present invention herein illustrated is applied to a motor wheel. It will be understood that the present invention is not limited to this specific application but can be used to advantage in other work such as, for instance, airplanes where it is desired that the cylinders rotate.

Other features and advantages will hereinafter appear.

Figure 1:
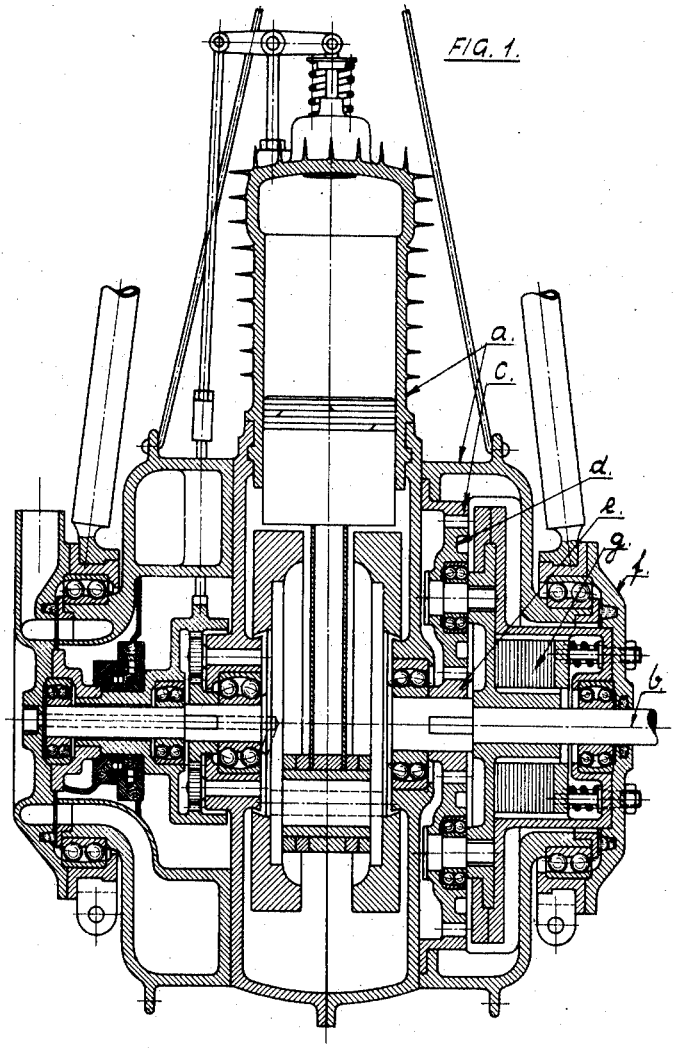
Figure 1 is a vertical sectional view taken through the motor of the present invention.
Figure 2:
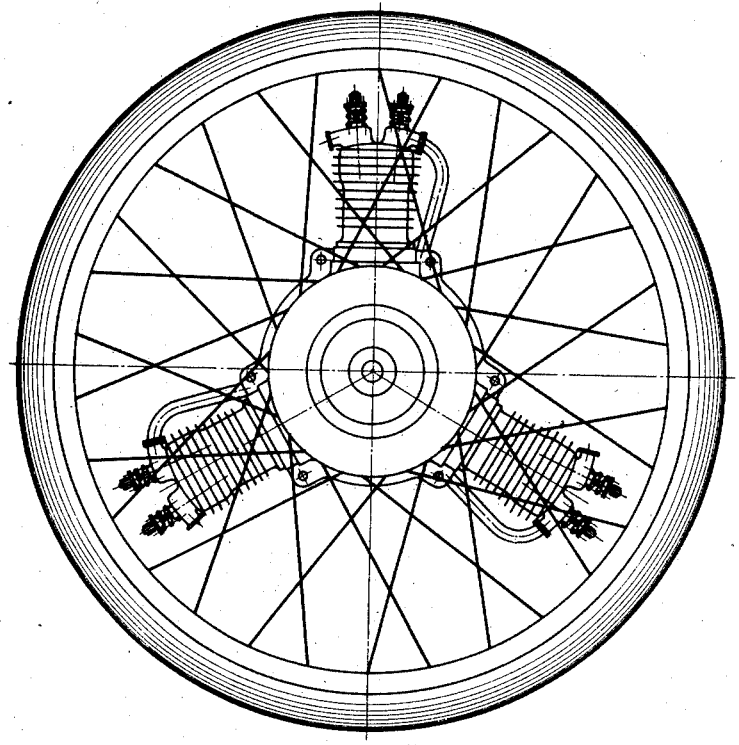
Fig. 2 shows the motor of the present invention applied to a motor wheel.

The motor of the present invention is of the air-cooled type and comprises a frame $a$ constituted by the crank case and the cylinders. This frame is rotatably mounted on bearings $f$ which is rigidly connected to the frame of the vehicle. The frame $a$ is connected by suitable stay rods of the rim of the wheel to which it is applied so that the frame $a$ and the wheel rotate as a single body.

The cylinders may be located at equal distance around the wheel to maintain the center of gravity and the axis of rotation coincident as much as possible. The cylinders are each provided with the usual pistons and piston rods, the latter being connected to a crank shaft $b$. The crank shaft $b$ is journaled in the bearing members $f$ of the main frame.

At one side of the engine adjacent the piston rods and mounted on the crank shaft $b$ there is provided suitable mechanism for controlling the valves and ignition. This mechanism comprises a timer disk for the sparking plug and a cam disk for controlling the over-head valves of the cylinders.

The explosions of the gas in the cylinders tend to cause a relative rotation between the crank shaft $b$ and the frame $a$ carrying the cylinders. Thus when the cylinders are held against movement by the wheel or other parts connected thereto, the crank shaft will rotate in the same manner as in engines having stationary cylinders.

The operative connection between the crank shaft $b$ and the frame $a$ according to the present invention is such that the crank shaft can rotate idly without imparting its motion to the frame. This driving connection comprises a planetary system of gears comprising a sun gear $e$; planet gears $d$ of which there may be any suitable number; and gear $c$ arranged on the frame $a$ and having its teeth projecting inwardly therefrom. The sun gear $e$ is splined to the crank shaft $b$ and therefore the rotation of the crank shaft is transmitted to the planet gears $d$ which mesh therewith. The planet gears $d$ are rotatably mounted on a disk rotatably mounted on the crank shaft $b$ and mesh with the internal gear $c$. If the disk carrying the planet gears is permitted to rotate, the rotation of the sun gear $e$ on the crank shaft will not transmit motion or power to the internal gear $c$ or the frame $a$ to which the gear $e$ is attached, but will merely result in the idle rotation of the crank shaft and the disk carrying the planet gears. When the disk carrying the planet gears $d$ is held against rotation, however, for instance by connecting the disk to the main non-rotating frame $f$, the rotation and power of the crank shaft is transmitted to the frame $a$ and the wheel carried thereby. In this case the crank shaft is not held against rotation as is ordinary in structures of this type, but is permitted to rotate in the opposite direction to that of the frame $a$ and wheel because of the planetary gear system and the holding of the disk carrying the planet gears against rotation. Thus it will be seen the high velocities of the pistons is divided between the rotation of the cylinders and the crank shaft making the resultant velocity of the cylinders and the wheel considerably less but the resultant tractive power developed considerably greater. While the relative speed between the crank shaft and the wheel is the result of the piston speed, yet the relative speed between each of them and the frame is relatively low and within the limits conducive to good traction.

The means provided by the present invention for holding the disk carrying the planet gears $d$ against rotation, and thus causing the rotation of the wheel, comprises a friction clutch $g$. This clutch $g$ is of the multiplate or disk type and has one side fixed to the frame $f$ against rotation and the other side fixed to the disk carrying the planet gears. The disks of the clutch when in their non-clutching position leave the disk carrying the planet gears to rotate freely. When the pressure against the fixed side of the clutch is increased the plates are brought into closer contact and the disk carrying the planet gears is firmly held against rotation and as above described the rotation of the frame $a$ and the wheel carried thereby is effected. It is well understood that the clutching action of this type of clutch can be varied at will; therefore, the speed of rotation of the frame $a$ and the wheel can be varied practically universally by varying the speed with which the disk carrying the planet gears rotates. For this reason the clutch provided by the present invention is extremely advantageous in a motor of this type. The motor may be started with the clutch in unclutching position; then the clutching action may be gradually increased to bring the frame $a$ and the wheel carried thereby to the proper momentum and after this the clutching action is brought to a maximum whereby the clutching action is practically positive, all without any appreciable jarring or jerking. The clutch has other advantages, for instance, in absorbing shocks and jolts which ordinarily would be transmitted to the crank shaft and piston.

The present invention is applicable, as above stated, to other kinds of work. For instance in airplanes the propeller can be started without rotating the cylinders and then, when the motor operates properly, the clutch can be gradually thrown in to start the cylinders rotating.

I claim as my invention:—

1. In an internal combustion motor; the combination of a non-rotating frame; a cylinder frame mounted to rotate on said non-rotating frame; a crank shaft mounted to rotate on said non-rotating frame; and means whereby the crank shaft and cylinder rotate simultaneously in opposite directions on said non-rotating frame, said means comprising a slip clutch by means of which the speed of rotation of the cylinder frame on said non-rotating frame may be varied with relation to the speed of rotation of the crank-shaft on said non-rotating frame.

2. In an internal combustion motor, the combination of a non-rotating frame; a cylinder frame mounted to rotate on said non-rotating frame; a crank-shaft mounted to rotate on said non-rotating frame independently of the cylinder frame; gearing between said cylinder frame and said crank-shaft whereby a connection between the two rotating parts is maintained; a friction clutch connected to said non-rotating frame; and means operated upon by said friction clutch and connected to said gearing for causing the crank-shaft and cylinder frame to rotate in opposite directions on the non-rotating frame.

3. In an internal combustion motor, the combination of a non-rotating frame; a cylinder frame mounted to rotate on said non-rotating frame; a crank shaft mounted to rotate on said non-rotating frame independently of the cylinder frame; a gear on the crank shaft; planet gears meshing with said gear; a disk carrying said planet gears; an internal gear on the cylinder frame meshing with the planet gears; and a friction clutch connected to the non-rotating frame for rendering said disk non-rotating to cause the cylinder and crank shaft to rotate, the planet gears causing the direction of rotation of the cylinder frame to be the opposite of the direction of rotation of the crank shaft.

4. In an internal combustion motor; the combination of a non-rotating frame; a cylinder frame mounted to rotate on said non-rotating frame; a crank shaft mounted to rotate on said non-rotating frame independently of the cylinder frame; a gear on the crank shaft; planet gears meshing with said gear; a disk carrying said planet gears; an internal gear on the cylinder frame meshing with the planet gears; and a friction slip clutch connected to the non-rotating frame adapted to control the speed of rotation of the disk carrying the planet gears whereby the resultant speed of the cylinder frame is controlled.

YRJÖ JOHNANNES AALTONEN.